United States Patent [19]

Pinarer et al.

[11] Patent Number: 4,854,109
[45] Date of Patent: Aug. 8, 1989

[54] APPARATUS AND METHOD FOR FORMING FOAM CUSHIONS FOR PACKAGING PURPOSES

[75] Inventors: Talat I. Pinarer, Seymour; German Gavronsky, Stamford, both of Conn.

[73] Assignee: Sealed Air, Saddle Brook, N.J.

[21] Appl. No.: 235,013

[22] Filed: Aug. 22, 1988

[51] Int. Cl.$^4$ .......................... B65B 9/02; B65B 3/18
[52] U.S. Cl. ...................................... 53/397; 53/451; 53/554; 53/580
[58] Field of Search ................. 53/410, 451, 397, 469, 53/468, 472, 474, 554, 555, 580

[56] References Cited

U.S. PATENT DOCUMENTS

| | | | |
|---|---|---|---|
| 3,011,934 | 12/1961 | Bursak | 53/554 X |
| 3,054,236 | 9/1962 | Stroop | 53/554 |
| 3,245,197 | 4/1966 | Van Mil, Jr. et al. | 53/555 X |
| 3,874,146 | 4/1975 | Watkins | 53/554 |
| 4,215,524 | 8/1980 | Saylor | 53/555 X |
| 4,631,905 | 12/1986 | Maloney | 53/554 |
| 4,646,510 | 3/1987 | McIntyre | 53/554 X |
| 4,674,268 | 6/1987 | Gavronsky et al. | 53/468 |
| 4,768,330 | 9/1988 | Lane, Jr. et al. | 53/554 |

Primary Examiner—Horace M. Culver
Attorney, Agent, or Firm—Bell, Seltzer, Park & Gibson

[57] ABSTRACT

An apparatus and method is disclosed for successively forming foam filled bags or cushions of the type wherein a foamable composition is deposited in a plastic bag. The method and apparatus includes advancing a pair of plastic webs along a substantially horizontal path of travel and through the nip of a pair of drive rollers, while heat sealing the opposing longitudinal side edges of the webs together. Periodically, a predetermined amount of the foamable composition is deposited between the advancing webs from a position offset from the center of the pair of plastic webs and the heat sealing along the side edges is periodically and momentarily interrupted to form side edge openings for the subsequent escapement of gases generated during foaming. The advance of the webs is momentarily terminated, and a heated wire then engages the webs to sever the formed bag, while forming a sealed top edge of the formed bag and a sealed bottom edge for the next succeeding bag. The advance then again commences, and the cycle is repeated to successively form the foam filled bags. The offset position from which the foamable composition is deposited prevents foamable composition from splashing outside of the bags being formed.

17 Claims, 5 Drawing Sheets

APPARATUS AND METHOD FOR FORMING FOAM CUSHIONS FOR PACKAGING PURPOSES

FIELD OF THE INVENTION

The present invention relates to the manufacture, filling and sealing of plastic bags from stock material and is particularly directed towards the formation of foam-in-place packaging cushions. This application is related to application Ser. No. 121,223 filed Nov. 16, 1987 on behalf of Charles R. Sperry and now U.S. Pat No. 4,800,708 and assigned to the assignee of the present invention, the contents of which are hereby incorporated by reference.

Background Of The Invention

Forming protective packaging for various articles of different sizes and shapes is a common problem in the packaging industry. In many circumstances, various articles of different sizes and shapes have to be packaged within generally square or rectangular packing cartons for handling and shipment. When the size and shape of the article to be packaged varies from such rectangular or square shapes, a typical solution is to include some sort of cushioning material to fill up the otherwise empty space represented by the difference in shape of the article and that of the container.

In one such prior packaging method, the cushioning material comprises a loose, friable material which is poured into the package to completely surround the articles. In another method, the articles are wrapped in sheets of cushioning material. Still another method currently in use involves foam-in-place packings, wherein a plastic bag containing a foamable composition is placed in the carton so as to surround the product. The foam thereafter expands in the bag and hardens. Foamable compositions of this type are well known in the art, and they are also referred to as foaming agents or foam precursors. Generally these materials are a combination of polymeric materials and either gases or gas-generating compounds. When properly mixed and distributed, gases permeate the polymeric materials, forming the resulting foam.

U.S. Pat. No. 4,674,268 to Gavronsky et al., and which is commonly owned with the present invention, discloses an apparatus for automating the fabrication of foam filled bags of the above described type. In particular, the apparatus disclosed in this prior patent advances a supply of plastic tubing, transversely heat seals the tubing to form individual bags, forms slits across each bag, opens the bags at the slits, and then inserts and injection cartridge laterally into the slits for filling each bag with the desire foamable composition. Also, the seal across the top of each bag may have interruptions, to permit the gas generated during foam formation to escape without disturbing the integrity of the bag.

While the Gavronsky et al. apparatus represents a significant improvement over the prior essentially manual bag forming procedures, certain disadvantages remain. In particular, the requirement that the apparatus slit the plastic tubing, then open the bag, and then laterally insert a nozzle and inject the foamable composition into the bag necessitates a rather complicated mechanical system. Also, it is difficult to insure that all of the foamable composition enters the bag, and spillage is a common problem.

The Sperry apparatus likewise represents an improvement over the Gavronsky apparatus by disclosing an apparatus which forms such bags from two webs of plastic film material. The foamable composition can be added between the webs as the bag is being formed, thereby eliminating the step—and associated mechanical complexities—of opening the bag. Nevertheless, some disadvantages remain. First, Sperry calls for directing the webs downwardly as they converge. This results in an upwardly extending V-shaped web of plastic which prevents the foam injection nozzle from being positioned closely adjacent the mouth of the bag being formed. Second, the vertical orientation of the injection nozzle with respect to both the mouth of the bag being formed and the web formed by the plastic tends to encourage the foam exiting the nozzle to splash upwardly and fail to completely enter the mouth of the bag. Finally, the size and shape of the opening in the housing of the device through which the plastic webs enter the device tends to catch the plastic as it moves through the opening, occasionally causing a problem. Specifically, the generally rectangular-shaped wider portion at the center of the opening forms 90° corners in the top of the housing over which the webs must pass and these tend to catch the advancing webs as they pass.

Furthermore, the foamable compositions used in conjunction with such packaging techniques tend to have somewhat adhesive properties before they harden into foam. Therefore, if they splash outside of the bag being formed—a relatively frequent occurrence in these previous devices—they tend to stick to, and then harden upon, other portions of the apparatus and its surroundings. At best, the hardened foam is inconvenient to remove and at worst, it can interfere with further operation of the apparatus.

It is accordingly an object of the present invention to provide a method and apparatus for forming foam cushions of the described type, and which avoids the above noted disadvantages of the prior systems.

It is a more specific object of the present invention to provide a method and apparatus for successively forming foam cushions, and which simultaneously fills and fabricates the bags from a pair of webs of plastic film, and which substantially eliminates spillage of the foamable composition.

It is also an object of the present inventions to provide an apparatus for forming foam cushions and which is of relatively simple structural design, and which is able to provide gas ventilation openings in each bag by a simple procedure.

It is a further object of the present invention to provide a method and apparatus for forming foam cushions which is easily adapted for use in a totally mechanized operation for packaging one or more articles in a container.

SUMMARY OF THE INVENTION

These and other objects and advantages of the present invention are achieved in the embodiments illustrated herein, by the provision of a method and apparatus which includes advancing a pair of webs of plastic film along substantially horizontal predetermined paths of travel from respective supply sources, and including guiding the advancing webs into opposing face-to-face contact at a first heat sealing station. At the heat sealing station, the opposing longitudinal side edges of the advancing webs are heat sealed to each other. Periodically, a predetermined amount of a foamable composition is introduced between the pair of webs of plastic film from a position, and at an angle, offset from the center of the opening through which the webs are passed, and so as to be deposited in each bag being formed. Also, the heat sealing of the pair of webs is periodically and momentarily interrupted along at least one of the side edges during the advance of the webs through the first heat sealing station, so as to form at least one unsealed side edge opening for each bag. Finally, the webs are advanced to a second heat sealing station and transversely heat sealed upstream of the unsealed side edge portions, to form a sealed top edge for each successive bag of foamable composition and including severing each bag from the next succeeding bag while forming a sealed bottom edge for the next succeeding bag.

Because the advance of the pair of webs from the respective supply sources includes advancing the webs in a generally horizontal direction, the predetermined amount of foamable composition is introduced from a discharge location which is in closer proximity to the point at which the webs initially contact each other than in any previous apparatus. This arrangement, and the offset angle from which the foam is directed, serves to direct the foamable composition into the resulting bag in a manner such that splashing and spillage of the foamable composition tends to take place inside the bag rather than onto the advancing webs or the other surroundings.

BRIEF DESCRIPTION OF THE DRAWINGS

Some of the objects and advantages of the present invention having been stated, others will appear as the description proceeds, when taken in conjunction with the accompanying drawings, in which.

DETAILED DESCRIPTION OF THE PREFERRED EMBODIMENT

Referring more particularly to the drawings, FIGS. 2-9 illustrate a preferred embodiment of an apparatus for successively forming foam cushions in accordance with the present invention. In the illustrated embodiment, the apparatus is generally indicated at 10, and it comprises a frame which mounts a housing 11 and pair of horizontally directed and laterally spaced apart spindles 12 for rotatably supporting a pair of supply means, illustrated as the supply rolls 13, of a suitable plastic web W. Typically, the plastic webs W may be between about 12 and 18 inches in width, and the webs may comprise a single ply high density polyethylene having a thickness of about 0.75 mils.

Figure 2:
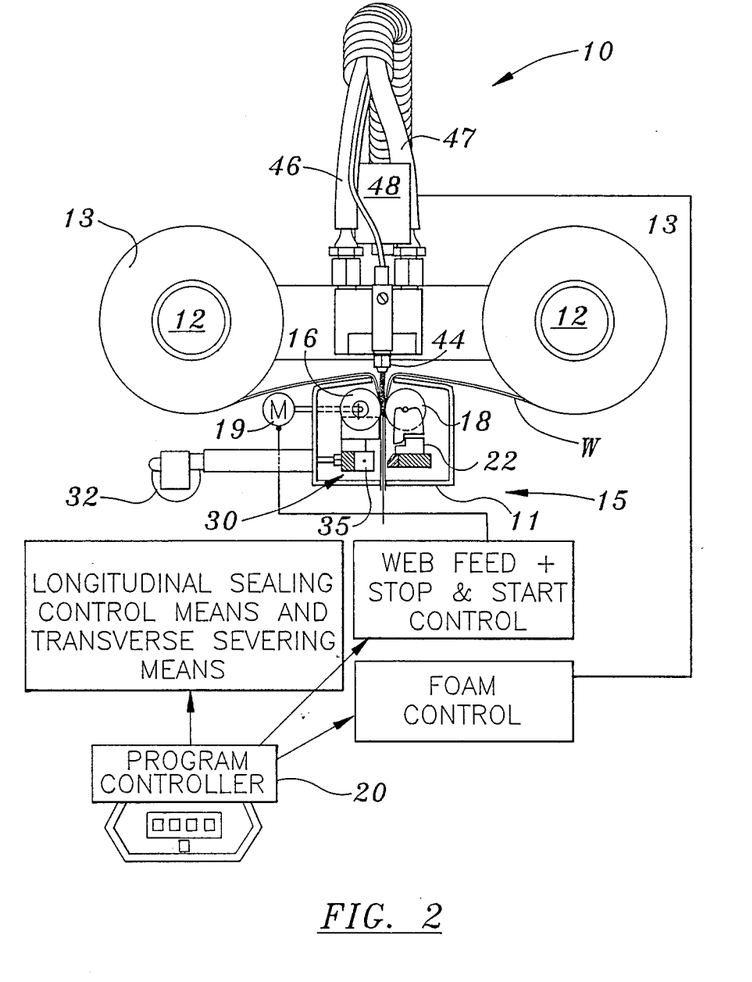
FIG. 2 is a partly sectioned and schematic side elevation view of the drive roll means and the first and second heat sealing means of the invention.

The webs W are advanced from the supply rolls 13, and through a relatively narrow longitudinal opening 14 in the housing 11, by drive roll means broadly designated at 15 which define a nip for receiving the webs therebetween, and for guiding the advancing webs along a predetermined substantially horizontal path in a converging relationship and into opposing face-to-face contact at the nip. The drive roll means 15 comprises a first pair of coaxially aligned drive rollers 16, 16' mounted for rotation about a first horizontal axis on one side of the nip, and a second pair of coaxially aligned idler rollers 18, 18' mounted for rotation about a second horizontal axis which is parallel to the first axis and is located on the other side of the nip. Each of the rollers of each pair is aligned across the nip with a roller of the other pair. The pair of drive rollers 16, 16' are preferably fabricated from a rubber-like material, and they are rotated by a motor 19, which is in turn controlled by the program controller 20 as schematically illustrated in FIG. 2.

Figure 5:
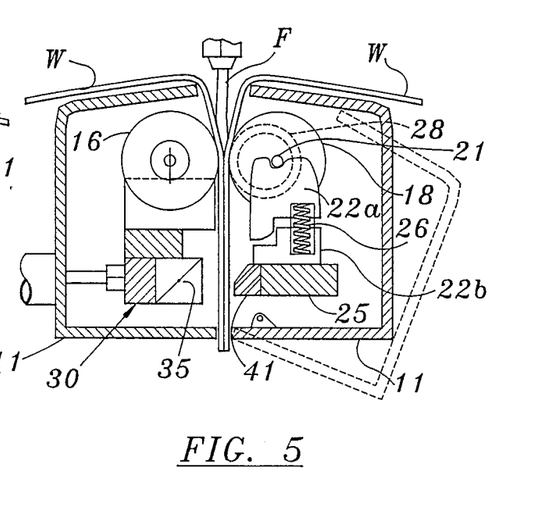
FIG. 5 is a sectioned side elevation view of the drive roll means and heating means as shown in FIG. 2.
Figure 9:
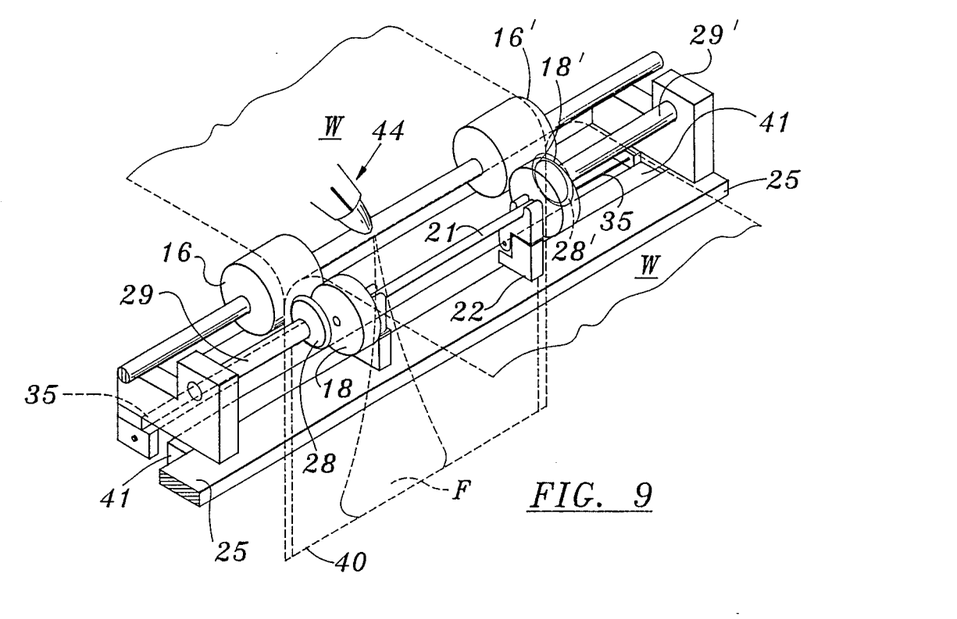
FIG. 9 is a perspective view of the web advancing and heat, sealing means of the invention.

The pair of idler rollers 18, 18' of the drive roll means are preferably fabricated form metal having a knurled surface, and they are mounted on an axle 21 which in turn is supported by a pair of posts 22 as best seen in FIGS. 5 and 9. Each post 22 is composed of two components 22a, 22b which are pivotal relative to each other, and the lower component 22b is fixedly mounted to a fixed frame member 25. Also, a spring 26 is positioned between the two components 22a, 22b to bias the idler rollers 18, 18' toward the drive rollers 16, 16' across the nip. Thus the two pairs of rollers securely engage and advance the plastic webs through the nip upon actuation of the drive motor 19.

Figure 4:
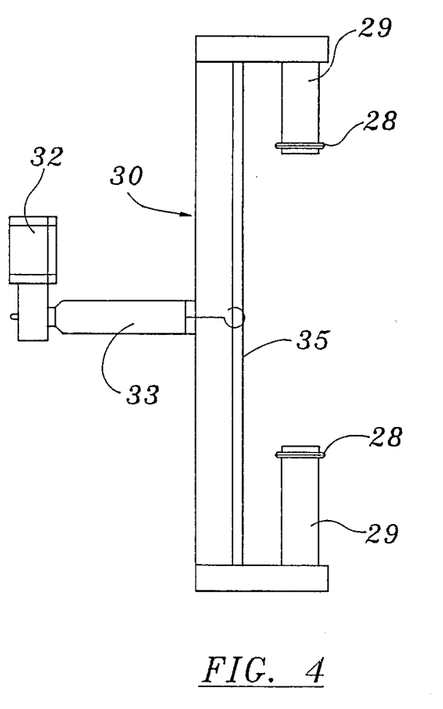
FIG. 4 is a view similar to FIG. 3 and illustrating the first and second heating means of the apparatus.

A first heat sealing means is positioned along the path of travel and immediately adjacent the drive roll means for heat sealing the longitudinal side edges of the advancing plastic webs while they are in opposing face-to-face contact. This first heat sealing means comprises a pair of electrically heated rolls 28, 28' positioned adjacent the nip, and as best seen in FIG. 4, the heated rolls 28, 28' are rotatably mounted at the ends of coaxial shafts 29, 29', which are in turn mounted to a slidable carriage 30. The coaxial shafts 29, 29' are laterally adjustable so that the respective positions of the heated rolls 28, 28' can in turn be adjusted to seal bags of different widths without excessive waste along the sealed edges of the bag. Also, the heated rolls 28, 28' are laterally positioned so as to be aligned across the nip with respective one of the drive rollers 16, 16', and so that the drive rollers serve as back-up rollers for the heated rolls 28, 28'.

Figure 6:
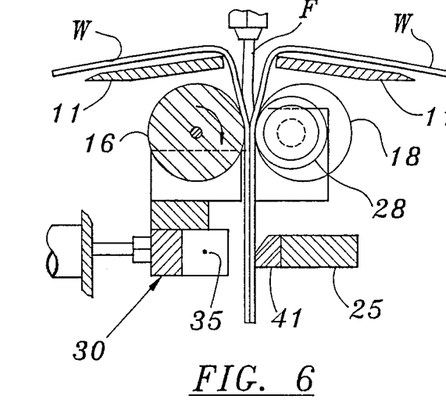
FIGS. 6-8 are views similar to FIG. 5, and showing the heating means respectively in a first operative position, a second non-operative position, and a third position wherein the transverse heating means is operative.
Figure 7:
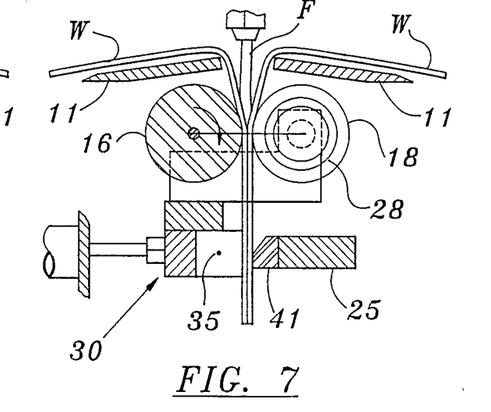

The carriage 30 is mounted to the frame of the apparatus 10 for movement between a first operative position as seen in FIG. 6, and wherein the heated rolls 28, 28' are positioned to engage the side edges of the advancing webs W and effect sealing, and a second position, as shown in FIG. 7 wherein the heated rolls are laterally spaced form the advancing webs. The slidable movement of the carriage is effected by a small reversible motor 32, which is operatively connected to a lead screw 33 which is connected to the carriage.

Figure 8:
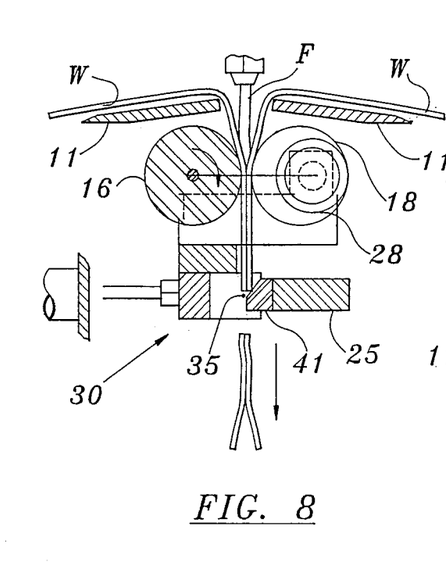

The carriage 30 also mounts a second heat sealing means which is positioned along the path of travel of the webs for heat sealing the webs together in the transverse direction. More particularly, the second heat sealing means comprises an electrically heated wire 35 which is mounted on the carriage so as to extend in the transverse direction. Also, the carriage 30 is adapted to be moved by the motor 32 to a third position as shown in FIG. 8, wherein the heated rolls 28, 28' are laterally spaced further from the webs than in the second position, and wherein the heated wire 35 engages the webs. By appropriate design of the program controller 20, the advance of the webs is preferably terminated when the carriage 30 moves to its third position, and so that the heated wire 35 engages the webs while the webs are stationary. As a result, the heated wire severs the formed bag or cushion 38 (FIG. 10) form the next succeeding bag 38' (FIG. 11) so that the formed bag drops downwardly. Concurrently, the wire 35 also forms a sealed top edge 39 of the formed bag 35 along the lower side of the severance line, while also forming a sealed bottom edge 40 of the next succeeding bag along the upper side of the severance line. Preferably, a rubber pad 41 extends along the adjacent edge of the frame member 25 as seen in FIGS. 6–8 for holding the webs in engagement with the wire when the carriage is advanced to the third position.

As best seen in FIG. 2, the operation of the reversible motor 32 and thus the lateral movement of the carriage 30 is controlled by the program controller 20, and by design, the program controller actuates the motor 32 so that the carriage 30 periodically and momentarily moves from the first operative position to the second position during the advance of the webs and while each successive bag has passed substantially completely through the nip. As a result, each side edge of each bag includes a non-sealed ventilation opening 42, 42' (FIG. 10) adjacent the eventual top edge 39, to thereby allow gas generated during foam formation to escape from within the bag. In a preferred embodiment, the openings 42, 42' extend for about one inch and they are positioned about one inch from the eventual top edge of the bag.

The apparatus 10 of the present invention further comprises means for periodically introducing a predetermined amount of foamable composition F between the opposing webs at a location upstream of the location at which the two webs are guided into the nip, and so that the foamable composition is deposited in each bag being formed and as the webs are being advanced and sealed along the longitudinal side edges. The means for thus depositing the foamable composition comprises a nozzle mechanism 44 and pair of hoses 46, 47 which are mounted on a suitable frame immediately above the nip, with the hoses leading from a suitable source of the chemical to the nozzle. Also, a conventional valve 48 is provided for selectively opening and closing the nozzle in accordance with the signals from the program controller 20.

In order to encourage any splashing foam to remain in the bag being formed, the nozzle 44 is positioned in a vertical plane defined by the longitudinal dimension of the opening 14 and at an angle within the plane which is nonperpendicular to the substantially horizontal paths of travel. In this arrangement, foamable composition deposited into each bag being formed avoids splashing directly upwardly from the mouth of the bag being formed, but instead is encouraged to splash into the bag as the webs are being advanced.

Figure 3:
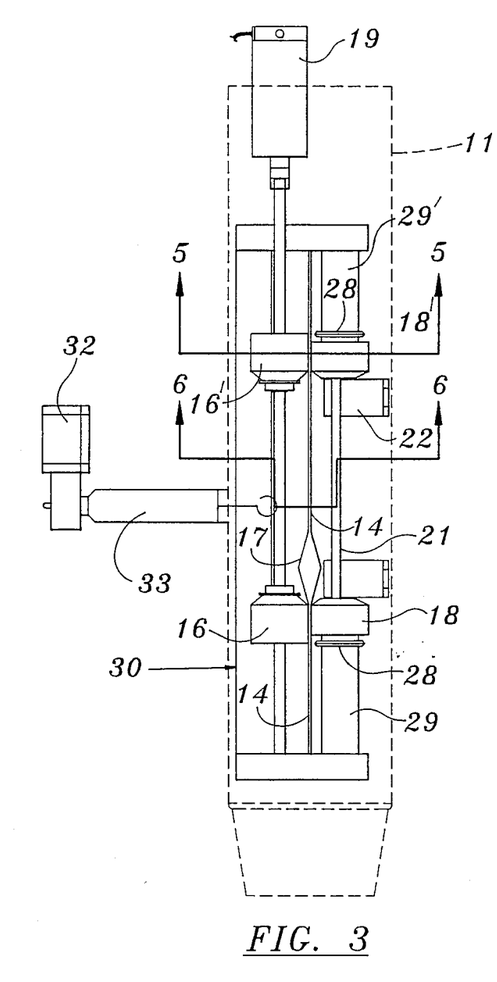
FIG. 3 is a fragmentary plan view of the advancing means shown in FIG. 2.

Additionally, and as best seen in FIG. 3, the longitudinal opening 14 further includes means for guiding the webs W into the housing 11 while forming a mouth between the webs into which the foamable composition may be directed. In the illustrated embodiment these means comprise a widened portion 17 of the opening 14 which has a parallelogram configuration, with the acute angles of the parallelogram lying along the longitudinal dimension of the opening 14. With the widened portion 17 thus configured, the webs W always pass over an edge in the opening 14 which has no less than an obtuse angle, and the webs thereby pass more smoothly over the edges and into the housing 11.

Figure 1:
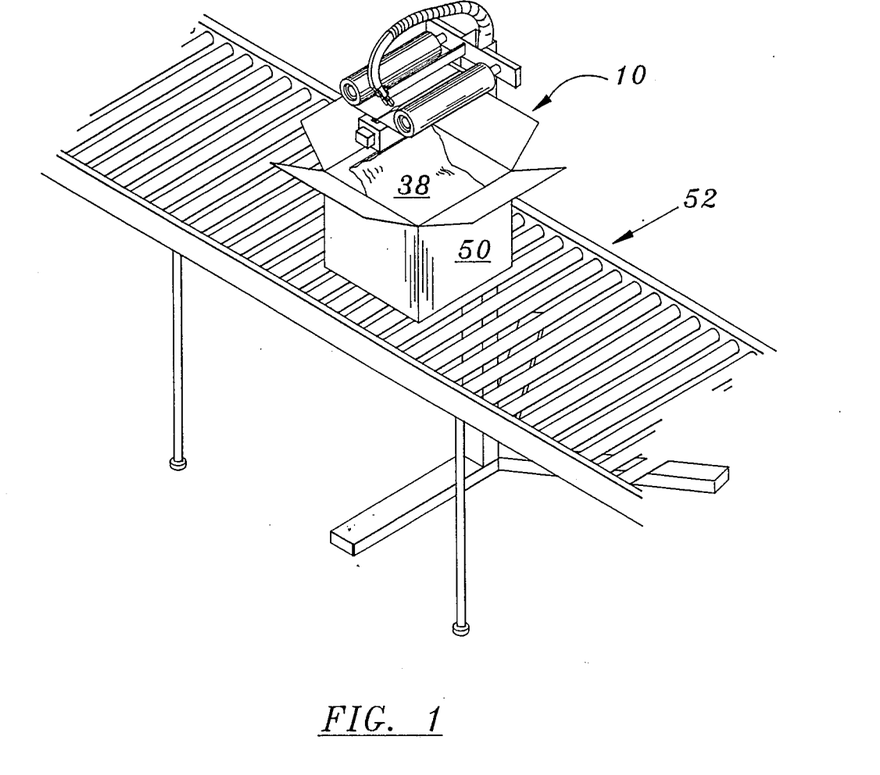
FIG. 1 is a perspective view of a portion of a packaging production line which embodies the features of the present invention.

Furthermore, and as also best illustrated in FIGS. 1, 3 and 9, the widened portion 17 and the nozzle 44 are positioned longitudinally away from the center of the opening 14 in a direction towards the nonperpendicular angle set forth above. In this manner, the mouth formed by the webs is likewise positioned away from the center of the opening 14 so that foamable composition may be directed into one side of a bag being formed and any of the foamable composition directed from the nozzle 44 that splashes upon entering the bag will tend to splash within the bag and towards the other side of the bag rather than out of the bag.

To now describe the sequence of operations in more detail, the webs w of plastic are initially guided into and through the nip manually, with the idler roller 18, 18' being movable laterally against the force of the springs 26 to facilitate their insertion. Upon release, springs 26 move the idler rolls laterally to engage the drive rollers and grip the webs therebetween. The apparatus is then started, which results in the drive rollers being rotted, to advance the webs through the nip. Concurrently, the heated rolls 28, 28' engage the opposing longitudinal side edges of the advancing webs to heat seal the side edges together. At a predetermined time as determined by the program controller 20, the nozzle 44 of the foam supply is opened, causing a predetermined amount of the foamable composition F to be introduced between the advancing pair of webs and while they are converging toward each other in the manner best seen in FIG. 2. The deposited composition passes downwardly through the nip, i.e. through the open space between the pairs of rollers 16, 16' and 18, 18', and is thus deposited in the bag being formed. The amount of the composition F which is deposited is determined by the size of the bag which the apparatus has been programmed to produce, which is typically about 18 inches in length and width.

Figure 10:
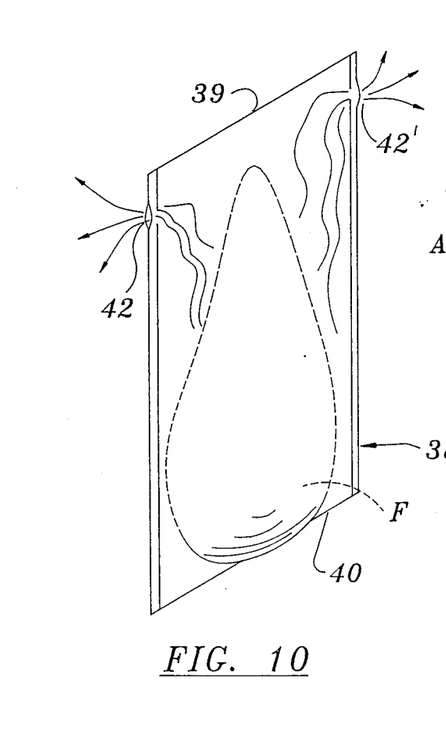
FIG. 10 is a perspective view of a foam filled bag produced in accordance with the present invention.
Figure 11:
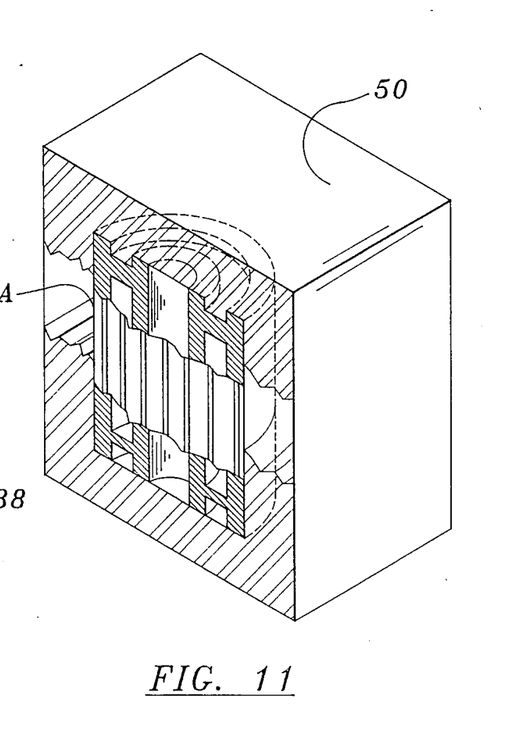
FIG. 11 is a sectional view illustrating a closed container and supported article, and which includes a pair of foam filled packaging cushions produced in accordance with the present invention.

The program controller 20 also acts to periodically and monetarily interrupt the heat sealing along the side edges, by actuating the motor 32 to laterally shift the carriage 30 from the operative position to the second position as shown in FIG. 7, and then back to the operative position. This jogging of the carriage is timed so that the heated rolls 28, 28' are separated from the webs at a location closely adjacent the resulting top edge 34 of the bag, as seen in FIG. 10, to thereby form the ventilating openings 42, 42', which permit escape of gas generated during foam formation. Next, the program controller 20 signals the motor 32 to move the carriage to the third or sealing position as shown in FIG. 8, and concurrently, to disengage the motor 19 and thus terminate the advance of the webs. As noted above, this results in the electrically heated wire 35 engaging the stationary webs, to sever the formed bag 35 from the next succeeding bag, while also forming a sealed top edge 39 for the formed bag and a sealed bottom edge 40 for the next succeeding bag. It will also be noted that during this severing operation, the heated rolls 28, 28' are separated from the side edges of the webs so as to not overly heat the side edges while the webs are stationary. After a predetermined time delay, the carriage 30 is returned to the operative position and the drive motor 19 is engaged, and the above cycle is repeated to form another foam filled bag.

FIG. 1 illustrates a portion of a packaging production line for protectively packaging one or more articles in a container 50, and which includes the above described apparatus 10 for forming foam bags for cushions 35 which are utilized in the packaging. In the embodiment of FIG. 1, the production line includes a conveyor 52 which serially advances open top containers such as the container 50 carrying the articles to be protectively packaged to a position immediately below the cushion forming apparatus 10. Thereafter, the container 50 is delivered to a box closing and sealing station (not shown). The conveyor controls by which the containers are thus advanced are conventional, as are the constructional details of the article loading station and the box closing and sealing station, and these components will not be further described herein.

At the cushion forming apparatus 10, a foam cushion 38 is dropped directly form the apparatus and into the container 50 before the foamable composition in the cushion has completely foamed. Also, it will be seen that the leading lower edge 40 of each dropped cushion is oriented to extend transversely of the path of travel of the container, to thereby facilitate laying the cushion over the article of articles which may be present in the container. The cushion is then deformed into a surround and conforming relationship with the upper portion of the article during the closing and sealing of the container. Thereafter the foam of the cushion expands to further surround the articles, and the foam then hardens. As a result, a supporting a protective, relatively rigid foam cushion is positioned above the articles being packages. As indicated schematically in FIG. 11, a cushion 38 may be inserted both before and after an article or articles is placed into the container, to thereby further protect the articles as is desired or necessary.

In the drawings and specification, preferred embodiments of the invention have been illustrated and described, and although specific terms are employed, they are used in a generic and descriptive sense only and not for purposes of limitation.

That which is claimed is:

1. An apparatus for successively forming foam cushions for packaging purposes wherein each cushion comprises a closed plastic bag filled with foam and having a ventilation opening along at least one side edge thereof for escapement of gas generated during foam formation, said apparatus comprising:

supply means for each of two webs of plastic film;

a housing having a relatively narrow longitudinal opening therein for receiving the two webs of plastic film from said supply means, said longitudinal opening including means for guiding the webs into said housing while forming a mouth between the webs into which a foamable composition may be directed;

means within said housing for advancing the two webs of plastic film along a predetermined substantially horizontal path of travel perpendicular to said longitudinal opening from said supply means and into said opening in said housing and for guiding said webs into opposing face-to-face contact;

first heat sealing means positioned within said housing and along said path of travel for heat sealing longitudinal side edges of the advancing plastic webs while they are in opposing face-to-face contact;

means positioned above said housing and above said longitudinal opening therein for periodically introducing a predetermined amount of foamable composition between the opposing webs, said foamable composition introducing means being positioned in a vertical plane defined by the longitudinal dimension of said opening and at an angle within said plane which is nonperpendicular to said substantially horizontal path of travel so that foamable composition deposited into each bag being formed avoids splashing directly upwardly from the mouth of the bag and instead is encouraged to splash into the bag as the webs are being advanced and sealed along said longitudinal side edges;

control means for periodically and momentarily interrupting operation of said first heat sealing means to provide a ventilation opening along at least one side edge of each bag being formed to thereby allow gas generated during foam formation to escape from within each bag; and second heat sealing means positioned within said housing and along said path of travel for heat sealing said webs together transversely thereof to form a sealed top edge of a foam filled bag while also forming the sealed bottom edge of the next succeeding bag and for severing each formed bag from the next succeeding bag.

2. An apparatus according to claim 1 wherein said means for guiding the webs into said housing and for forming a mouth between the webs comprises a widened portion of said longitudinal opening through which the webs pass into said housing so that a mouth is formed between the webs as the webs pass over said widened portion of said opening, said widened portion having parallelogram configuration with the acute angles of the parallelogram lying along the longitudinal dimension of said opening so that as the webs enter said housing they always pass over an edge of said opening which has no less than an obtuse angle, and the webs thereby pass more smoothly over said edges and into said housing.

3. An apparatus according to claim 1 wherein said foamable composition introducing means and said widened portion of said opening are positioned longitudinally away from the center of said longitudinal opening in a direction towards said nonperpendicular angle, so that the mouth formed by the webs is likewise positioned longitudinally away from the center of said opening whereby foamable composition may be directed into one side of a bag being formed and any of the foamable composition directed from said introducing means that splashes upon entering the bag will tend to splash within the bag and towards the other side of the bag rather than out of the bag.

4. The apparatus as defined in claim 1 wherein said means for advancing and guiding the webs comprises drive roll means defining a nip for receiving the webs therethrough.

5. The apparatus as defined in claim 4 wherein said first heat sealing means comprises a pair of heated rolls positioned adjacent said nip for engaging respective side edges of the advancing webs as they pass through said nip.

6. The apparatus as defined in claim 5 wherein said control means comprises a carriage mounting said pair of heated rolls, means mounting said carriage for movement between a first operative position wherein said heated rolls are positioned to engage the advancing webs, and a second position wherein said heated rolls are laterally spaced from the advancing webs, and program controller means for periodically moving said carriage between said first and second positions.

7. The apparatus as defined in claim 6 wherein said second heating means comprises an electrically heated wire mounted on said carriage, and wherein said means mounting said carriage permits lateral movement to a third position wherein said heated rolls are laterally spaced further from the webs than in said second position and said heated wire is in contact with the webs, and wherein said program controller means acts to periodically move said carriage to said third position such that the heated wire severs the webs and seals the webs together along each side of the line of severance.

8. The apparatus as defined in claim 7 wherein said drive roll means comprises a first pair of coaxially aligned rollers mounted for rotation about a first horizontal axis on one side of said nip, and a second pair of coaxially aligned rollers mounted for rotation about a second horizontal axis which is parallel to said first axis and on the other side of said nip, and with each of the rollers of each pair being aligned across the nip with a roller of the other pair, and wherein said means for periodically introducing a foamable composition comprises a nozzle located above said nip and medially between the rollers of each pair.

9. The apparatus as defined in claim 8 wherein said heated rolls are aligned across said nip with respective one of the rollers of one of the pair of rollers, and such that the aligned rollers serve as back up rollers to the heated rolls in said first position of said carriage.

10. The apparatus as defined in claim 9 further comprising means mounting at least one of said first and second pairs of rollers and including means for laterally biasing said at least one pair toward the other pair.

11. A method of successively forming foam cushions for packaging purposes wherein each cushion comprises a closed plastic bag filled with foam and having a ventilation opening along at least one side edge thereof for escapement of gas generated during foam formation, said method comprising the steps of advancing a pair of webs of plastic film along respective generally horizontal predetermined paths of travel from respective supply sources, and including converging the advancing webs into opposing face-to-face contact as the webs pass into a housing through a longitudinal opening in the housing, with the longitudinal opening arranged generally perpendicularly to the predetermined paths of travel, while heat sealing the opposing longitudinal side edges of the advancing pair of webs to each other at a first heat sealing station within the housing to sealingly interconnect the opposing webs along opposite side edges, while periodically introducing a predetermined amount of foamable composition between the advancing pair of webs of plastic film by directing foamable composition from a position in a plane defined by the longitudinal dimension of said opening and at an off-vertical angle with respect to the horizontal paths of travel so that foamable composition being deposited into each bag being formed tends to avoid splashing directly upwardly from the mouth of the bag being formed and instead is encouraged to splash into the bag as the webs are being advanced and sealed along their longitudinal side edges, while periodically and momentarily interrupting the heat sealing of the pair of webs to each other along at least one of said side edges during the advancement of the webs through the first heat sealing station so as to form at least one unsealed longitudinal side edge portion which defines at least one side edge opening for each bag, and while advancing the sealingly interconnected webs to and through a second heat sealing station and transversely heat sealing the webs together upstream of the unsealed side edge portions at the second heat sealing station to form a sealed top edge for each successive bag of foamable composition and including severing each bag form the next succeeding bag while forming a sealed bottom for the next succeeding bag.

12. A method according to claim 11 wherein the step of introducing foamable composition comprises introducing the foamable composition between the webs at a location between the webs which is longitudinally offset from the center of the opening in the housing in a direction towards the off-vertical angle whereby foamable composition may be directed into one side of a bag being formed and any of the foamable composition that splashes upon entering the bag will tend to splash within the bag and towards the other side of the bag rather than out of the bag.

13. The method as defined in claim 11 wherein the step of periodically introducing a predetermined amount of foamable composition includes periodically introducing the composition from a discharge location between the converging webs and in close proximity to the point at which the webs initially contact each other.

14. The method as defined in claim 13 wherein the step of advancing a pair of webs further includes passing the webs between drive roll means which define a nip, and wherein said first heat sealing station comprises a pair of heated rolls positioned adjacent said nip and in contact with said advancing webs.

15. The method as defined in claim 14 wherein the step of periodically and momentarily interrupting the heat sealing of the pair of webs includes effecting lateral displacement of said pair of heated rolls so that they are removed from contact with said advancing webs.

16. The method as defined in claim 15 wherein the step of transversely heat sealing the webs together includes contacting the webs with a heated wire.

17. The method as defined in claim 16 comprises the further steps of momentarily terminating the advance of the two webs an laterally displacing said pair of heated rolls from contact with said webs during the step of contacting the webs with a heated wire.

* * * * *